Feb. 24, 1970   TSUTOMU IKEDA ET AL   3,497,587
METHOD OF MAKING A FLEXIBLE CONTAINER
Filed Sept. 22, 1966   2 Sheets-Sheet 1
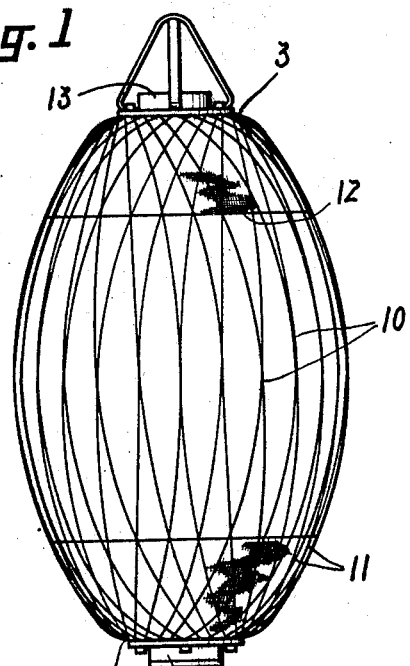
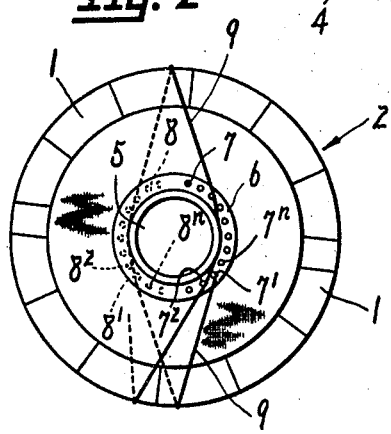
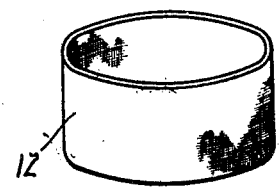
INVENTORS
TSUTOMU IKEDA
KIYOSHI FUKUI
BY
ATTORNEYS

United States Patent Office 3,497,587
Patented Feb. 24, 1970

3,497,587
METHOD OF MAKING A FLEXIBLE CONTAINER
Tsutomu Ikeda, Kyoto, and Kiyoshi Fukui, Uji, Japan, assignors to Taiyo Kogyo Company Limited, Taisho-ku, Osaka, Japan
Filed Sept. 22, 1966, Ser. No. 581,225
Claims priority, application Japan, Oct. 27, 1965, 40/65,802
Int. Cl. B29c *1/00;* B29d *31/00;* B29h *9/02*
U.S. Cl. 264—255                              4 Claims

ABSTRACT OF THE DISCLOSURE

A method of forming tough flexible containers is comprised of the steps of painting a knock-down mold with a solvent-soluble chlorosulfonated or halogenated polyethylene resin; selectively applying fabrics, non-woven fabrics, yarns, strings or tapes onto the mold, the material applied may be pasted or not; winding filaments onto the mold by a filament winding process, the filaments may be impregnated with a resin, painting the filaments with a resin or with a synthetic rubber, heat treating the filaments and then removing the knock-down mold. The strength of the container can be increased by fitting a reinforcing member made of fabrics, non-woven fabrics or the like on the inner peripheral surface of the container but not at its openings.

Summary of the invention

This invention relates to tough flexible containers and methods of making the same.

Conventional flexible containers have been made by sewing or welding tarpaulin. However, such method has not been adapted to mass-production. Further, as tarpaulin is coated on the surface with such thermoplastic resin as vinyl chloride, said resin has not penetrated into and adhered to the interior of the cloth structure. Therefore, the flexible container made of such tarpaulin is poor in the wear-resistance and other strengths. Further, in making the same, there is an unreasonableness that unnecessary parts will be produced in the four corners of the tarpaulin. Therefore, it has been difficult to expect the reduction of the production cost.

The present invention has been completed as a result of making various researches to eliminate the above mentioned defects and is a method of mass-producing flexible containers by making containers by a filament winding method and painting them with a resin. In this method, filaments are wound on a knock-down mold and are painted with a resin and the mold is removed. In removing the mold, it is necessary to easily release the mold. Therefore, according to the present invention, the mold is painted with a resin solution as a releasing agent so that the mold may be easily released and at the same time said resin for releasing the mold may become a resin layer on the back surface of the container. The resin to be used should be high in the water-proofness and water-repellency and should be soft and tough and have a proofness against chemicals. That is to say, the present invention is a method of making flexible containers comprising painting a knock-down mold with one of a solvent-soluble chlorosulfonated polyethylene resin and halogenated polyethylene resin, then pasting or not pasting fabrics or non-woven fabrics, if necessary, onto the mold, winding any filaments impregnated or not impregnated with a resin on the mold by a filament winding method, further painting the filaments with a resin or synethic rubber, heat treating them and then removing the mold.

Therefore, an object of the present invention is to provide a flexible container made by a filament winding method without the need of cutting and sewing sheets.

A next object of the present invention is to provide a container made of the minimum material but having the maximum strength.

A further object of the present invention is to provide a container in which all the fibers covering the entire body are concentrated in the opening parts so as to be most effective dynamically in suspending and supporting the container.

Another object of the present invention is to provide a light durable water-proof container.

In the accompanying drawings:

FIG. 1 is an elevation of a container made by the method of the present invention;

FIG. 2 is a plan view showing a process for making the container in FIG. 1;

FIG. 3 is a perspective view of a reinforcing member to be used for the container shown in FIG. 1;

Figure 4:
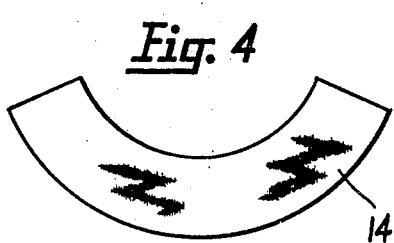
FIG. 4 is an elevation of another reinforcing member to be used for the same container.

The constitution of the present invention shall be detailed.

For the solvent-soluble chlorosulfonated or halogenated polyethylene resin to act simultaneously to release the mold and to form the back surface of the container in the present invention is used any of Hypalon (trade name) made by chlorinating and chlorosulfonating polyethylenes halogenating polyethylenes. It is already known that these resins become water-repellent, flexible, tough films. But it is not known at all that they make the mold release easy and become a resin layer on the back surface of the container. This technical idea is the greatest feature of the present invention.

These resins may be used either alone or as combined. Further, if required, such vulcanizing agent as metallic oxide is used to elevate the water-proofness, heat-proofness and strength. For the solvent can be used any of hydrocarbons and halogenated hydrocarbons. A resin film is formed on the mold by spraying, brushing or dipping. The filaments to be used for filament winding are of natural, chemical or synthetic fibers. However, in respect of the strength, such synthetic fibers as of nylon, polyesters, polypropylenes and vinylon are desirable. A filament of any of such forms as of circular or elliptic cross-sections or hollow or tape-shaped forms and filaments of any of such forms as of strands, yarns or rovings can be used.

If fabrics, non-woven fabrics, yarns, strings or tapes are pasted to the mold releasing resin before winding the filaments, the tensile strength in every direction of the container will further improve. The resin to be used for the resin layer for binding the filaments and finishing the surface may be not only the resin for releasing the mold but also any of acryl series, rubber series and urethane series resins, melamine resins, urea resins and phenol resins applied alone or as properly combined. In such case, as required, a vulcanizing agent, cross-linking agent or coloring agent may be added. As a painting method, there can be used spraying, brushing or dipping. If the resin must be heated, a heating treatment should be carried out.

After the above steps are finished, if the mold is removed, there will be obtained a container in which the tough filaments with or without the fabrics, non-woven fabrics, yarns, strings or tapes, are contained in the inner surface, a resin film is formed on the front surface and the filaments themselves or the filaments and fabrics, non-woven fabrics, yarns, strings or tapes are bound with the resin. A mouthpiece can be fixed to the opening made in each of the top and bottom parts of this container. This container is tough and flexible and can be utilized as a container having many excellent physical properties.

Examples of the present invention shall be given in the following:

Example 1

A bulging drum-shaped mold made of a metal and well washed with trichlorethylene and soap water was coated and painted with a toluene solution of a chlorosulfonated polyethylene resin (of trade name Hypalon produced by E. I. duPont de Nemours & Co., U.S.A., hereinafter) of a resin content of 34% and a viscosity of about 1,000 centipoises at 20° C. by means of brush and multifilaments of nylon of 210 deniers were then wound on the mold by a filament winding method and were dried with hot wind at 50° C. The wound filaments were then coated and painted with a viscous solution prepared by mixing 5 parts of magnesium oxide into 100 parts of the same toluene solution of the chlorosulfonated polyethylene resin as is mentioned above by means of a brush, were dried with hot wind at 50° C. and were then heat-treated at 120° C. for 20 minutes.

Thus, when the bulging drum-shaped mold made of a metal was removed, there was obtained a container in which nylon filaments were contained and both surfaces were formed of the chlorosulfonated polyethylene resin. This container was easy to fold. Its film was tough and had an excellent water-proofness and water-repellency. In this method, the chlorosulfonated polyethylene resin layer in contact with the bulging drum-shaped mold made of a metal made it easy to peel the container off the drum-shaped mold and acted to stop the slip of the filaments in winding them.

Example 2

A bulging drum-shaped mold made of a metal and well washed with trichlorethylene and soap water was coated and painted with a toluene solution of a chlorosulfonated polyethylene resin of a resin content of 30% and a viscosity of about 1,500 centipoises at 20° C. by means of a brush and a non-woven fabric of nylon fibers of Vilene No. 4000 (trade name) was pasted onto all the surface of the mold and was dried with hot wind at 50° C. The pasted fabric was then coated and painted with a viscous solution prepared by mixing 5 parts of magnesium oxide into 100 parts of the same toluene solution of the chlorosulfonated polyethylene resin as is mentioned above by means of a brush and was dried with hot wind at 50° C. Further multifilaments of nylon of 210 deniers were wound on the mold by a filament winding method, were then dried with hot wind at 50° C., were coated and painted with a mixture of the same toluene solution of the chlorosulfonated polyethylene resin as is mentioned above and magnesium oxide by means of a brush, were dried with hot wind at 50° C. and were then heat-treated at 120° C. for 20 minutes. This product was very easy to separate from the bulging drum-shaped mold made of a metal. When the mold was released, there was obtained a very flexible container in which the nylon filaments and non-woven fabric were contained and both surfaces were formed of the chlorosulfonated polyethylene resin.

This product was a container not only having the same features as in Example 1 but also having a stabilized form of a low expansion and having a very high strength.

Example 3

A bulging drum-shaped mold made of a metal and well washed with trichlorethylene and soap water was coated and painted with a toluene solution of a chlorosulfonated polyethylene resin of a resin content of 30% and a viscosity of about 1,000 centipoises at 20° C. by means of a brush and multifilaments of nylon of 210 deniers were then wound on the mold by a filament winding method and were dried with hot wind at 50° C. The wound filaments were then coated and painted with a toluene solution of a polyacrylic ester polymer resin of a resin content of 40% and a viscosity of about 10,000 centipoises at 20° C. by means of a rubber spatula and were dried with hot wind at 50° C. Further, the filaments were coated and painted with a silicone resin emulsion (of a solid content of 30%) by means of a spray gun, were dried with hot wind at 80° C. and were then heat-treated at 120° C. for 20 minutes. This product was very easy to separate from the bulging drum-shaped mold made of a metal. When the mold was released, there was obtained a very flexible container in which the nylon filaments were contained, the front surface was formed of the polyacrylic ester resin and the back surface was formed of the chlorosulfonated polyethylene resin.

This product was a container having an excellent wear resistance, light-proofness and weather-proofness as well as the same features as in Example 1.

Example 4

A bulging drum-shaped mold made of a metal and well washed with trichlorethylene and soap water was coated and painted with a toluene solution of a chlorosulfonated polyethylene resin of a resin content of 30% and viscosity of about 800 centipoises at 20° C. by means of a spray gun and a non-woven fabric of nylon fibers of Vilene No. 4000 (trade name) was pasted onto all the surface and was dried with hot wind at 50° C. Then, multifilaments of nylon of 210 deniers impregnated with Hycar Latex (trade name) which is a synthetic rubber latex of a butadiene-acrylonitrile copolymer of a solid content of 30% in advance were wound on the mold by a filament winding method and were dried with hot wind at 70° C. Then the filaments were coated and painted with a coloring solution prepared by mixing 5 parts of coloring agent Helizarine Yellow (trade name), 5 parts of melamine resin Sumitex Resin M-3 (trade name) and 0.5 part of hardening catalyst Sumitex Accelerator ACX (trade name) into 100 parts of the same Hycar Latex (trade name) as is mentioned above by means of a brush, were dried with hot wind at 70° C. and were then heat-treated at 120° C. for 20 minutes.

Thus the container was easily removed from the bulging drum-shaped mold made of a metal. There was obtained a very flexible container in which the nylon filaments and non-woven fabric were contained, the front surface was formed of the synthetic rubber layer and the back surface was formed of the chlorosulfonated polyethylene resin.

This product was a container having the same features as in Example 2.

Example 5

A bulging drum-shaped mold made of a metal and well washed with trichloroethylene and soap water was coated and painted with a solution prepared by mixing 1 part of netting agent Accel X–30 (trade name) into 100 parts of a toluene solution of a chlorosulfonated polyethylene resin and of a resin content of 34% and a viscosity of about 1,000 centipoises at 20° C. by means of a spray gun and a non-woven fabric of polyester fibers of Pancelon No. 29250 (trade name) was pasted to all the surface of the mold and was dried with hot wind at 50° C. Then multifilaments of polyester fibers impregnated with Hycar Latex (trade name) which is a synthetic rubber latex of a butadiene-acrylonitrile copolymer of a solid content of 40% in advance were wound on the mold by a filament winding method and were dried with hot wind at 70° C. Then the wound filaments were dipped in a dipping bath prepared by mixing 5 parts of coloring agent Helizarine Yellow (trade name), 10 parts of melamine resin Sumitex Resin M–3 (trade name) and 1 part of hardening catalyst Sumitex Accelerator ACX (trade name) into 100 parts of the same Hycar Latex (trade name) as is mentioned above, were pulled up, were dried with hot wind at 60 to 70° C. while being slowly rotated and were then heat-treated at 140° C. for 5 minutes.

Thus the container was easily removed from the bulging drum-shaped mold made of a metal. There was obtained a very flexible container in which the polyester filaments and non-woven fabric were contained, the front surface was formed of the synthetic rubber and the back surface was formed of the chlorosulfonated polyethylene resin. This product was a container having the same features as in Example 2.

An example of the method of making containers shall now be explained. During or at the beginning of winding filaments of natural, chemical or synthetic fibers by a filament winding method on the periphery of a knock-down bulging drum-shaped mold painted with a mold releasing agent so that the central part of each of the top surface and bottom surface may be an opening, a cylindrical reinforcing member made of such material as fabrics, non-woven fabrics, yarns, strings or tapes is arranged on the peripheral surface of said opening and then the peripheral surface except in the opening part is coated with such film material as a synthetic resin or synthetic rubber.

This shall be explained with reference to the drawings. In forming an opening 5 in the central part of each of the top surface 3 and bottom surface 4 of a bulging drum-shaped mold 2 made by assembling a required number of units 1 free to knock down, a filament 9 hung at the forward end on a pin $7_1$ among pins $7^1 \ldots 7^n$ on the top surface side of engaging pins $7 \ldots, 8 \ldots$ arranged at regular intervals on the peripheral edge 6 of any desired diameter is pulled up to the peripheral part of the drum of the maximum diameter on the other side diagonally to the peripheral part of the drum of the maximum diameter on one side by making said pin $7^1$ the first pin $8^1$ by skipping any desired number from a pin 8 located below on the same straight line as of said pin $7^1$, is then led to a pin $8^2$ from the pin $7^2$ by lagging by one from said pin $7^1$, is thus wound toward the pins 7 and 8 over 0 to 180 degrees in turn and is further wound to the final pins $7^n$ and $8^n$ located at 180 to 360 degrees so that, on the peripheral surface of the mold 2, necessarily the middle part may be of a coarse structure 10 and the upper and lower parts may be of a close structure. In such case, a cylindrical reinforcing member 12 made of non-woven fabrics is applied before winding the filament 9 or so as to be located between the first and second winds and, at the same time, when the reinforcing member 12 is loose, if it is contracted, it will be able to be fitted in to be lower. The peripheral surface except in the central parts of the top surface 3 and bottom surface 4 of the mold 2 are coated with such material as vinyl or a synthetic rubber so as to form a film body 16. Said film body is hardened as a container. The mold 2 is knocked down, each unit 1 is pulled out and, at the same time, a mouthpiece is fitted to the opening made in each of the upper and lower parts of the container.

Figure 5:
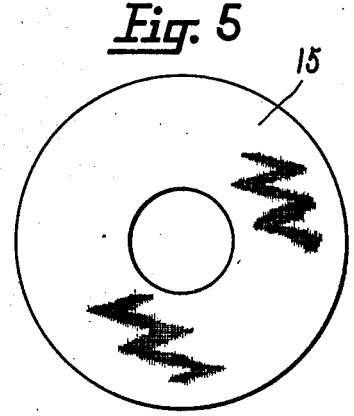
FIG. 5 is an elevation of a further reinforcing member to be used for the same container.
Figure 6:
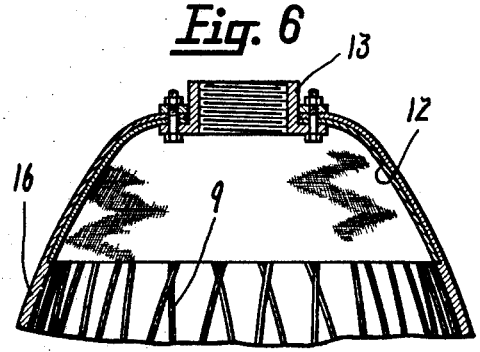
FIG. 6 is a partly vertically sectioned view of a container according to the present invention.

In FIG. 4, a fan-shaped reinforcing member 14 made of non-woven fabrics is wound to be in the form of a funnel before winding the filament 9 or so as to be located between the first and second winds below the opening in the central part of each of the top surface and bottom surface of the bulging drum-shaped mold for the container shown in FIG. 1. Such annular reinforcing member 15 as is shown in FIG. 5 can be also used. Further, a tape-shaped reinforcing member made in the form of V can be arranged so that the folded part may be located in the opening part.

In the manufacturing method according to the present invention, when a separate container made of a synthetic resin and in the same form as the bulging drum-shaped mold is arranged outside the mold so that the separated edges may be jointed and is coated with such coating material as a synthetic resin or synthetic rubber as mentioned above, a container having an internal container will be able to be obtained. Further, such filaments made of a synthetic resin as yarns or strings can be wound in a close structure on the bulging drum-shaped mold and can be dissolved and jointed so as to be an external film body.

In a modification of the present invention, the strength of the container can be further increased by fitting a reinforcing member made of fabrics, non-woven fabrics or the like on the inner peripheral surface except in the upper and lower opening parts. Further, in the above, an annular reinforcing member made of the same material as is mentioned above may be arranged near the peripheral surface of each of the upper and low opening parts. Also several reinforcing tapes each having both ends in the upper and lower opening parts and extended to the outer periphery of the container may be embedded in the container.

What is claimed is:

1. A method of making flexible containers comprising coating the support surface of a knock-down metal mold having a continuous peripheral support surface with one of a toluene solution of a solvent-soluble chlorosulfonated polyethylene resin and a solvent-soluble halogenated polyethylene resin having a resin content in the range of about 30 to 34% and a viscosity in the range of about 800 to 1500 centipoises at 20° C. so that the coating forms a continuous flexible interior lining for the container and forms a surface which is easily releaseable from the mold surface upon the completion of the molding operation, winding resin impregnated filaments on the coated support surface of the mold and leaving at least one opening in the coated and wound surface for removing the knock-down mold from the completed container, applying a coating of a resin material to the filaments after they are wound on the mold, heat treating the coating on the mold, at 120° C. for a period of approximately 20 minutes releasing the support surfaces of the mold from the interior resin coating of the container by collapsing the mold inwardly away from the interior resin coating, and removing the mold from the container thus formed through the opening fashioned in the container.

2. A method, as set forth in claim 1, comprising the step of depositing a reinforcing fabric layer on the resin coating on the mold prior to winding the resin impregnated filaments about the mold.

3. A method, as set forth in claim 1, wherein prior to heat treating the coating the step of drying the coating with hot air at a temperature within the range of 50 to 80° C.

4. A method, as set forth in claim 1, wherein the heat treating step is carried out at 140° C. for approximately 5 minutes after the step of drying the coating at a temperature in the range of 60° to 70° C.

References Cited

UNITED STATES PATENTS

| | | | |
|---|---|---|---|
| 2,794,481 | 6/1957 | Anderson | 18—45 X |
| 2,448,114 | 8/1948 | Olson et al. | 156—189 |
| 2,744,043 | 5/1956 | Ramberg | 156—155 |
| 3,047,191 | 7/1962 | Young | 156—173 X |
| 3,293,860 | 12/1966 | Stedfeld | 156—173 X |
| 3,303,079 | 2/1967 | Carter | 156—173 X |
| 3,220,910 | 11/1965 | Walkey | 156—155 |

OTHER REFERENCES

"Dupont Elastomers in Industry," pp. 11–12.
"Dupont Elastomer Chemical Dept.," Report No. 57–8, July, 1957, Bertick and Knox, pp. 5, 12–13.

ROBERT F. WHITE, Primary Examiner

K. J. HOVET, Assistant Examiner

U.S. Cl. X.R.

156—173, 289; 264—258, 300, 313